(12) United States Patent
Langton et al.

(10) Patent No.: US 10,380,337 B2
(45) Date of Patent: Aug. 13, 2019

(54) CONFIGURING A SANDBOX ENVIRONMENT FOR MALWARE TESTING

(71) Applicant: Juniper Networks, Inc., Sunnyvale, CA (US)

(72) Inventors: Jacob Asher Langton, Oakland, CA (US); Kyle Adams, Brisbane, CA (US); Daniel J. Quinlan, San Francisco, CA (US); Zhenxin Zhan, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/681,723

(22) Filed: Aug. 21, 2017

(65) Prior Publication Data

US 2017/0344740 A1 Nov. 30, 2017

Related U.S. Application Data

(63) Continuation of application No. 15/299,986, filed on Oct. 21, 2016, now Pat. No. 9,740,853, which is a
(Continued)

(51) Int. Cl.
*G06F 21/53* (2013.01)
*G06F 21/56* (2013.01)

(52) U.S. Cl.
CPC .......... *G06F 21/53* (2013.01); *G06F 21/566* (2013.01); *G06F 21/567* (2013.01)

(58) Field of Classification Search
CPC ....................................................... G06F 21/53
(Continued)

(56) References Cited

U.S. PATENT DOCUMENTS 6,907,396 B1 *  6/2005  Muttik .................. G06F 21/566
                                                            703/22
6,981,279 B1 * 12/2005  Arnold .................. G06F 21/566
                                                            703/27
(Continued)

FOREIGN PATENT DOCUMENTS

CN           102509039 A      6/2012

OTHER PUBLICATIONS

Sun et al., "V-MCS: A Configuration System for Virtual Machines," IEEE International Conference on Cluster Computing and Workshops, 2009, 7 pages.
(Continued)

*Primary Examiner* — Peter C Shaw
(74) *Attorney, Agent, or Firm* — Harrity & Harrity, LLP

(57) ABSTRACT

A device may receive a file to be analyzed in a sandbox environment, and may determine configuration information for configuring the sandbox environment. The configuration information may be determined based on at least one of: file information associated with the file to be analyzed, or client device information associated with a client device for which the file is intended. The device may configure the sandbox environment using the configuration information. The configuration information may identify a system configuration for the sandbox environment. The device may analyze the file in the sandbox environment based on configuring the sandbox environment using the configuration information.

20 Claims, 8 Drawing Sheets

Related U.S. Application Data continuation of application No. 14/674,099, filed on Mar. 31, 2015, now Pat. No. 9,477,837.

(58) Field of Classification Search
USPC .......................................................... 726/23
See application file for complete search history.

(56) References Cited

U.S. PATENT DOCUMENTS

| | | | |
|---|---|---|---|
| 8,180,893 B1* | 5/2012 | Spertus | G06F 21/53 709/200 |
| 8,381,298 B2 | 2/2013 | Blumfield | |
| 8,799,862 B2 | 8/2014 | Adamson | |
| 8,869,277 B2 | 10/2014 | Radinsky et al. | |
| 9,223,966 B1* | 12/2015 | Satish | G06F 21/53 |
| 9,477,837 B1 | 10/2016 | Langton et al. | |
| 9,489,516 B1* | 11/2016 | Lu | G06F 21/566 |
| 9,740,853 B2 | 8/2017 | Langton et al. | |
| 2004/0054924 A1* | 3/2004 | Chuah | H04L 47/10 726/22 |
| 2006/0161982 A1 | 7/2006 | Chari | |
| 2006/0242701 A1* | 10/2006 | Black | H04L 45/00 726/22 |
| 2012/0227105 A1 | 9/2012 | Friedrichs et al. | |
| 2012/0266244 A1* | 10/2012 | Green | G06F 21/566 726/24 |
| 2012/0272317 A1 | 10/2012 | Rubin et al. | |
| 2013/0247033 A1 | 9/2013 | Sawhney et al. | |
| 2013/0247187 A1 | 9/2013 | Hsiao et al. | |
| 2013/0347114 A1 | 12/2013 | Altman et al. | |
| 2014/0090061 A1 | 3/2014 | Avasarala et al. | |
| 2014/0130158 A1 | 5/2014 | Wang | |
| 2015/0172303 A1* | 6/2015 | Humble | H04L 63/1408 726/23 |
| 2015/0278513 A1* | 10/2015 | Krasin | G06F 9/5005 726/30 |
| 2015/0326594 A1* | 11/2015 | Chari | H04L 67/303 726/23 |
| 2015/0381649 A1* | 12/2015 | Schultz | H04L 63/1433 726/25 |
| 2016/0026788 A1* | 1/2016 | Martini | G06F 9/455 726/23 |
| 2016/0188878 A1* | 6/2016 | Kulkarni | G06F 21/56 726/23 |

OTHER PUBLICATIONS

Extended European Search Report corresponding to EP Application No. 15179116.7 dated Jul. 14, 2016, 6 pages.

Lee et al., "A Generic Virus Detection Agent on the Internet", 1997, IEEE, 1060-3425/97, 210-219.

* cited by examiner

CONFIGURING A SANDBOX ENVIRONMENT FOR MALWARE TESTING

RELATED APPLICATIONS

This application is a continuation of U.S. patent application Ser. No. 15/299,986, filed Oct. 21, 2016 (now U.S. Pat. No. 9,740,853), which is a continuation of U.S. patent application Ser. No. 14/674,099, filed Mar. 31, 2015 (now U.S. Pat. No. 9,477,837), both of which are incorporated herein by reference.

BACKGROUND

Malicious software ("malware") may refer to any software used to disrupt computer operations, gather sensitive information, gain access to private computer systems, or the like. Malware may refer to a variety of types of hostile or intrusive software, including a computer virus, a worm, a trojan horse, ransomware, spyware, adware, scareware, or other malicious software.

A sandbox environment may refer to a computing environment that may be used to test for malware. For example, a sandbox environment may be used to execute untested code, entrusted software (e.g., from unverified third parties), or the like. A sandbox environment may provide a tightly controlled set of resources for executing a software program without permitting the software program to harm a device that hosts the sandbox environment. For example, the sandbox environment may restrict access provided to the software program (e.g., may restrict network access, access to inspect a host system, read and/or write access, etc.) to prevent harm to the host device.

SUMMARY

A device may receive a file to be analyzed in a sandbox environment, and may determine configuration information for configuring the sandbox environment. The configuration information may be determined based on at least one of: file information associated with the file to be analyzed, or client device information associated with a client device for which the file is intended. The device may configure the sandbox environment using the configuration information. The configuration information may identify a system configuration for the sandbox environment. The device may analyze the file in the sandbox environment based on configuring the sandbox environment using the configuration information.

A computer-readable medium may store one or more instructions that, when executed by one or more processors, cause the one or more processors to receive a file to be analyzed for malware using a sandbox environment. The one or more instructions may cause the one or more processors to determine configuration information for configuring a system configuration of the sandbox environment. The configuration information may be determined based on at least one of: file information associated with the file to be analyzed for malware, or client device information associated with a client device for which the file is intended. The one or more instructions may cause the one or more processors to configure the system configuration of the sandbox environment using the configuration information. The one or more instructions may cause the one or more processors to analyze the file for malware using the sandbox environment based on configuring the system configuration of the sandbox environment using the configuration information.

A method may include receiving, by a device, a file to be analyzed in a computing environment. The method may include determining, by the device, configuration information for configuring the computing environment. The configuration information may be determined based on at least one of: the file to be analyzed, or a client device for which the file is intended. The method may include configuring, by the device, the computing environment using the configuration information. The configuration information may identify a system configuration for the computing environment. The method may include analyzing, by the device, the file in the computing environment based on configuring the computing environment using the configuration information.

DETAILED DESCRIPTION

The following detailed description of example implementations refers to the accompanying drawings. The same reference numbers in different drawings may identify the same or similar elements.

A security device (e.g., a firewall, a server, etc.) may use a sandbox environment to test a file for malware, such as by executing the file in the sandbox environment and monitoring for an indication that the file is malware. Different malware may be designed to exploit vulnerabilities of different system configurations different operating systems, different types of devices, different applications, etc.). Furthermore, the security device may use the sandbox environment to protect different types of client devices with different system configurations. Thus, using a standard sandbox environment (e.g., based on a default system configuration, such as a corporate operating system image), regardless of the file being tested for malware or the client device being protected from malware, may be less effective than configuring a custom sandbox environment to test for malware. Implementations described herein may assist in configuring a sandbox environment for malware testing based on a file being tested and/or a client device being protected, thereby increasing the effectiveness of malware testing and improving computer security.

Figure 1:
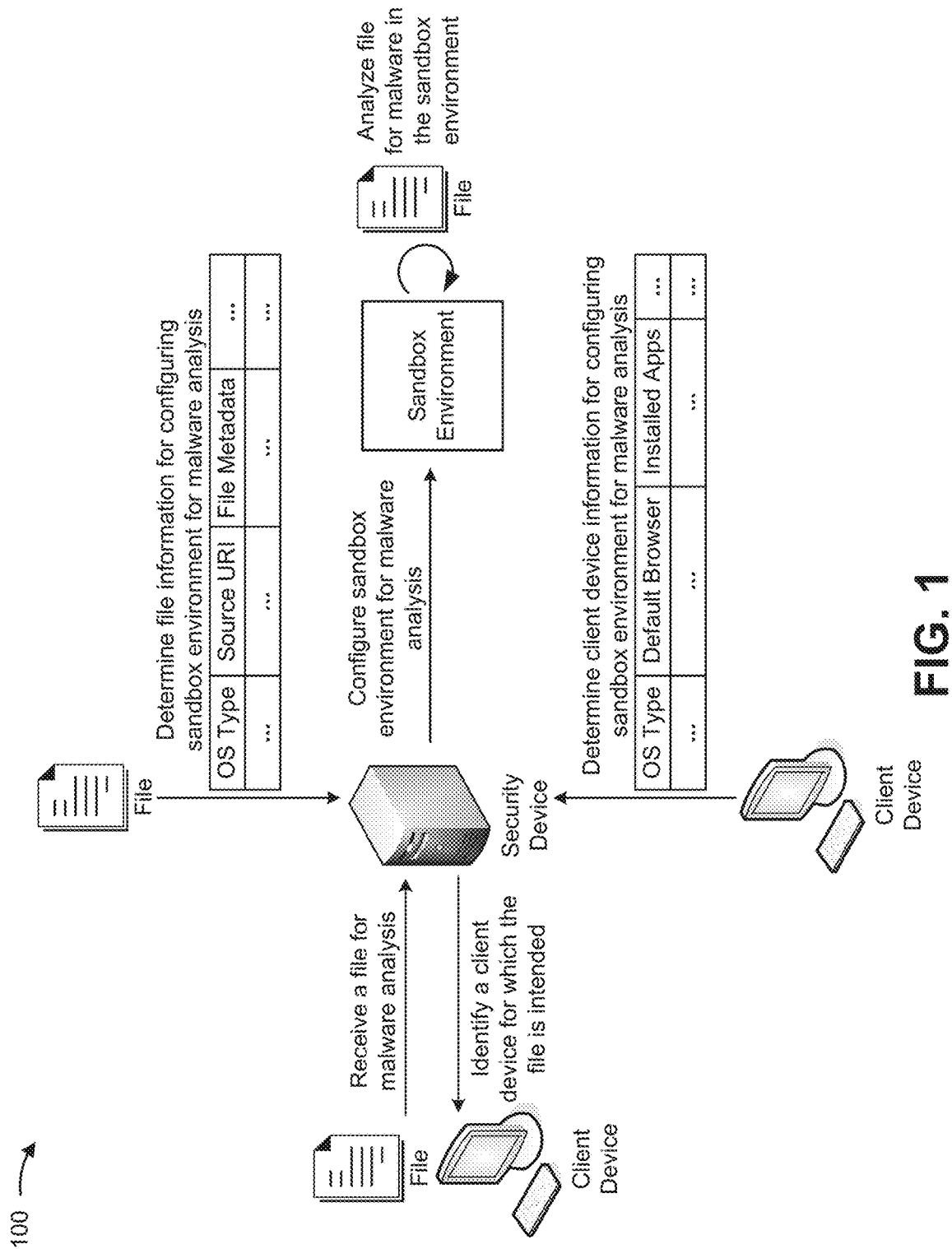
FIG. 1 is a diagram of an overview of an example implementation described herein.

FIG. 1 is a diagram of an overview of an example implementation 100 described herein. As shown in FIG. 1, a security device may receive a file for malware analysis. As further shown, the security device may analyze the file to determine file information for configuring a sandbox environment for a malware analysis. For example, the security device may analyze the file to determine an operating system type (e.g., an operating system capable of executing the file, an operating system vulnerable to the file, etc.), a source uniform resource identifier (URI) from which the file was obtained (e.g., which may indicate a browser configuration, etc.), file metadata associated with the file, or the like. The file information may indicate a system configuration to be used when configuring the sandbox environment. As shown, the security device may configure the sandbox environment, for testing the file for malware, based on the file information. In this way, the sandbox environment may be configured and/or customized to more effectively analyze the file for malware than if a default sandbox environment had been used to analyze the file for malware.

In some implementations, the security device may identify a client device for which the file is intended (e.g., a client device that requests the file, a client device to which the file is pushed, etc.). As further shown, the security device may determine client device information for configuring the sandbox environment for the malware analysis. For example, the security device may determine an operating system executing on the client device, a default browser associated with the client device, one or more applications installed on the client device, or the like. The client device information may indicate a system configuration to be used when configuring the sandbox environment, such that the sandbox environment may closely represent a system configuration of the client device. As shown, the security device may configure the sandbox environment, for testing the file for malware, based on the client device information. In this way, the sandbox environment may be configured and/or customized to more effectively analyze a file for malware, when protecting a particular client device, than if a default sandbox environment had been used to analyze the file for malware.

Implementations described herein may assist a security device with configuring and/or customizing a sandbox environment for testing a file for malware. In some implementations, the security device may configure the sandbox environment based on file information associated with the file to be analyzed for malware. Additionally, or alternatively, the security device may configure the sandbox environment based on client device information associated with a client device for which the file is intended. The file information and the client device information are described in more detail elsewhere herein. In some implementations, the security device may use a probabilistic analysis (e.g., machine learning) to configure the sandbox environment, as described in more detail elsewhere herein. In this way, the security device may analyze a file for malware using a sandbox environment that is best suited for the analysis.

Figure 2:
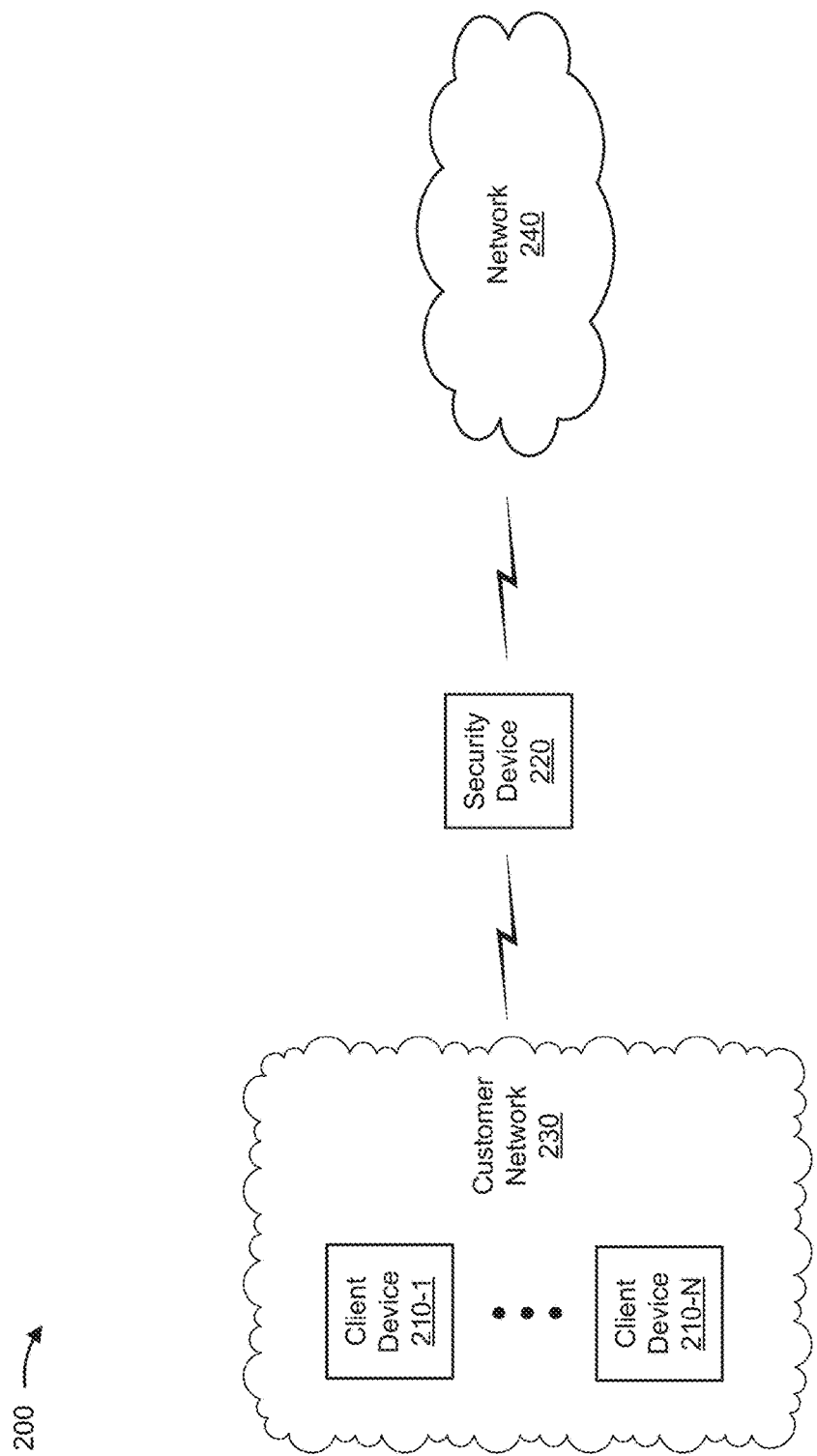
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as "client devices 210," and individually as "client device 210"), a security device 220, a customer network 230, and a network 240. Devices of environment 200 may interconnect via wired connections, wireless connections, or a combination of wired and wireless connections.

Client device 210 may include one or more devices associated with a system configuration. For example, client device 210 may include a desktop computer, a laptop computer, a tablet computer, a mobile phone (e.g., a smart phone, a radiotelephone, etc.), a server, or a similar type of device. In some implementations, different client devices 210 may have different system configurations, and may be impacted by malware in different ways. In some implementations, client device 210 may be capable of executing a file that includes malware, which may cause harm to client device 210, information stored by client device 210, a user of client device 210, and/or another client device 210. In some implementations, client device 210 may reside on customer network 230. In some implementations, client device 210 may configure and/or execute a sandbox environment for malware testing on client device 210 (e.g., instead of or in addition to security device 220 configuring and/or executing a sandbox environment for malware testing on security device 220).

Security device 220 may include one or more devices capable of processing and/or transferring network traffic associated with client device 210, and/or capable of providing a security service (e.g., a malware detection service) for client device 210 and/or customer network 230. For example, security device 220 may include a gateway, a firewall, a router, a bridge, a hub, a switch, a load balancer, an access point, a reverse proxy, a server (e.g., a proxy server), or a similar type of device. Security device 220 may be used in connection with a single client device 210 or a group of client devices 210 (e.g., client devices 210 associated with a private network, a data center, etc.). In some implementations, communications may be routed through security device 220 to reach the group of client devices 210. For example, security device 220 may be positioned within a network as a gateway to customer network 230 that includes the group of client devices 210. Additionally, or alternatively, communications from client devices 210 may be encoded such that the communications are routed to security device 220 before being routed elsewhere.

In some implementations, security device 220 may configure and/or execute a sandbox environment that may be used to analyze a file for malware. For example, security device 220 may configure and/or use the sandbox environment to monitor a file requested by and/or provided to client device 210 (e.g., before the file is provided to client device 210, after the file is provided to client device 210, etc.) to detect whether the file includes malware. In some implementations, security device 220 may determine configuration information, that identifies a system configuration for configuring the sandbox environment, based on file information (e.g., associated with a file to be tested for malware), client device information (e.g., associated with a client device 210 for which the file is intended), or the like. Security device 220 may configure the sandbox environment based on the configuration information, and may execute the file in the configured sandbox environment to detect whether the file includes malware.

Customer network 230 may include one or more wired and/or wireless networks. For example, customer network 230 may include a local area network (LAN), a private network, an intranet, a cloud computing network, a cellular network (e.g., a long-term evolution (LTE) network, a 3G network, a code division multiple access (CDMA) network, etc.), a public land mobile network (PLMN), a wide area network (WAN), a metropolitan area network (MAN), a telephone network (e.g., the Public Switched Telephone Network (PSTN)), an ad hoc network, the Internet, a fiber optic-based network, or the like, and/or a combination of these or other types of networks. In some implementations, customer network 230 may be a private network associated with client devices 210.

Network 240 may include one or more wired and/or wireless networks. For example, network 240 may include a cellular network, a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks. In some implementations, security device 220 may configure a sandbox environment for malware testing of a file, requested by client device 210 from a device (e.g., a server) associated with network 240, to determine whether the file includes malware. Additionally, or alternatively, a file may be pushed to client device 210 (e.g., from a device associated with network 240), and security device 220 may configure a sandbox environment for analyzing the file to determine whether the file includes malware.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 be implemented within a single device, or a single device shown in FIG. 2 may be implemented as multiple, distributed devices. For example, client device 210 and security device 220 may be implemented as a single device, in some implementations. Additionally, or alternatively, a set of devices (e.g., one or more devices) of environment 200 may perform one or more functions described as being performed by another set of devices of environment 200. For example, client device 210 may perform one or more operations described herein as being performed by security device 220.

Figure 3:
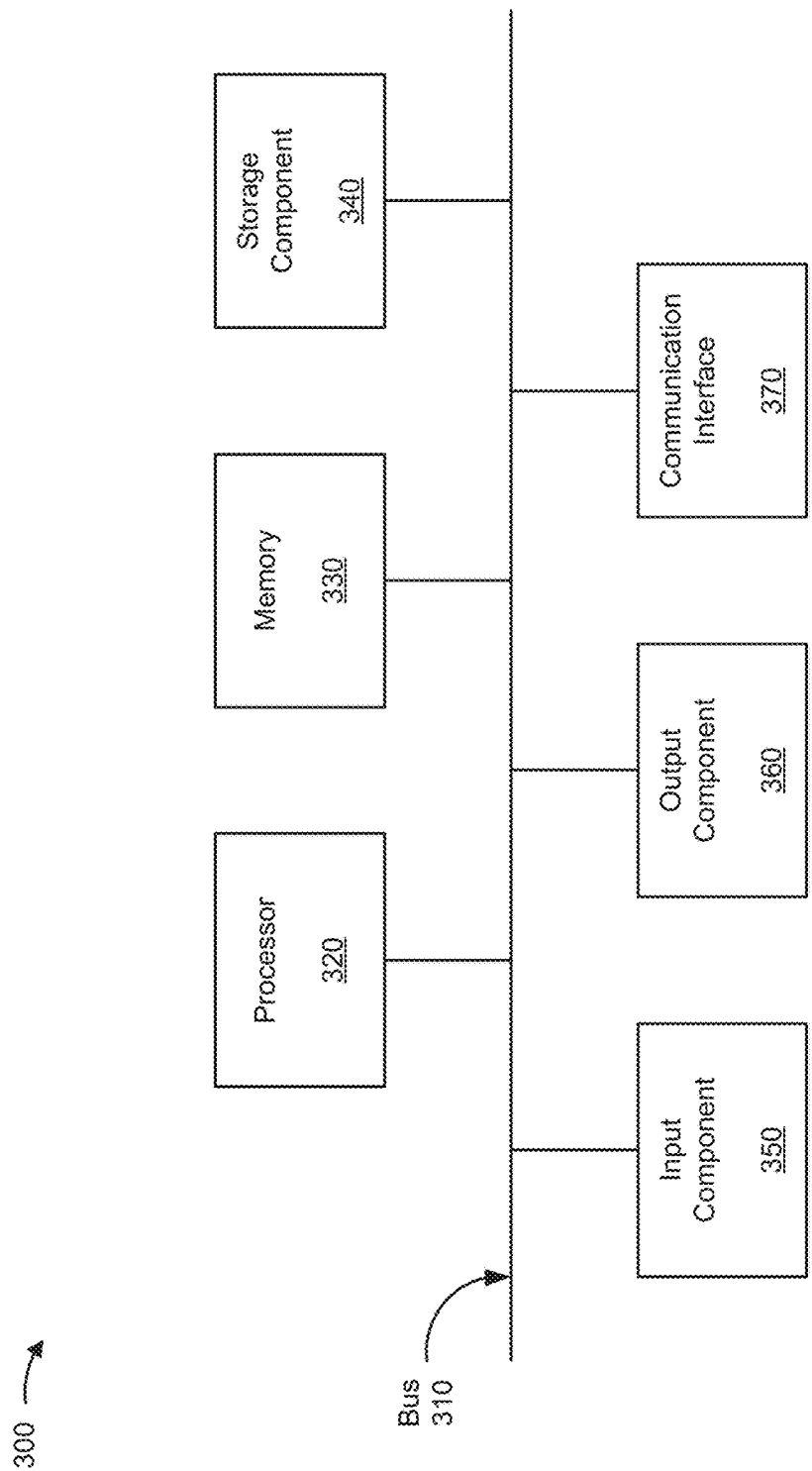
FIG. 3 is a diagram of example components of one or more devices of FIG. 2.

FIG. 3 is a diagram of example components of a device 300. Device 300 may correspond to client device 210 and/or security device 220. In some implementations, client device 210 and/or security device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
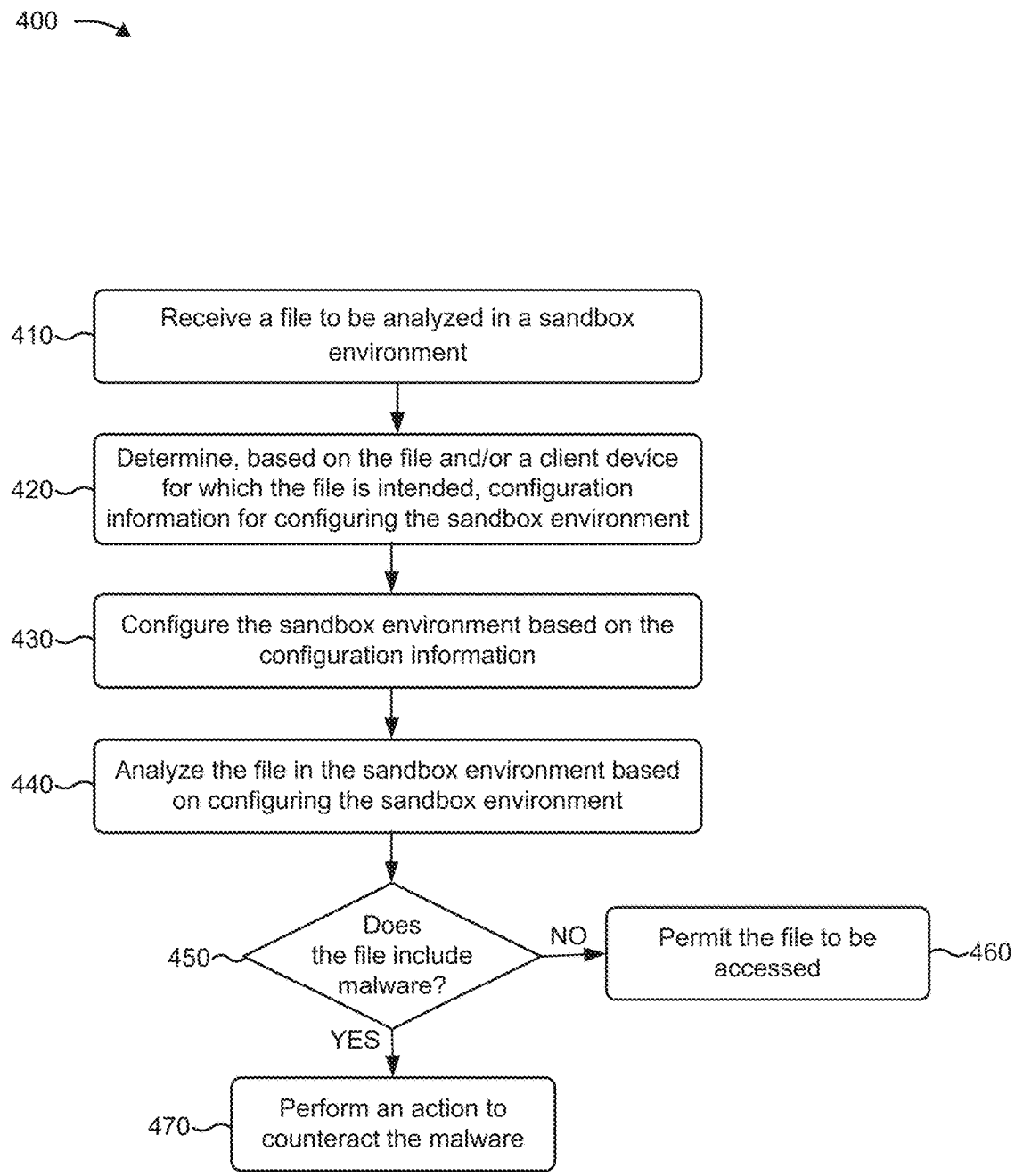
FIG. 4 is a flow chart of an example process for configuring a sandbox environment for malware testing.

FIG. 4 is a flow chart of an example process 400 for configuring a sandbox environment for malware testing. In some implementations, one or more process blocks of FIG. 4 may be performed by security device 220. In some implementations, one or more process blocks of FIG. 4 may be performed by another device or a set of devices separate from or including security device 220, such as client device 210.

As shown in FIG. 4, process 400 may include receiving a file to be analyzed in a sandbox environment (block 410). For example, security device 220 may receive a file (e.g., an executable file, an application, a program, etc.) to be analyzed in a sandbox environment. In some implementations, the file may be associated with client device 210 (e.g., may be stored by client device 210, may be executing on client device 210, may be requested by client device 210, may be sent to client device 210, etc.). As an example, client device 210 may request a file (e.g., from a website, via an email link, etc.), and security device 2220 may receive and/or analyze the file before the file is provided to client device 210. As another example, a file may be pushed to client device 210, and security device 220 may receive the file (e.g., may intercept the file before the file is received by client device 210, may obtain the file after the file is received by bent device 210, etc.).

In some implementations, security device 220 may analyze the file in a sandbox environment. The sandbox environment may include a computing environment for testing the file for malware, and may be associated with a particular system configuration. For example, the sandbox environment may include a virtual computing environment executing on a virtual machine with a particular system configuration. Security device 220 may customize the system configuration of the sandbox environment to provide a more effective analysis of the file than if the sandbox environment uses a standard or default system configuration, as described in more detail elsewhere herein.

As further shown in FIG. 4, process 400 may include determining, based on the file and/or a client device for which the file is intended, configuration information for configuring the sandbox environment (block 420). For example, security device 220 may determine configuration information that identifies a system configuration for configuring the sandbox environment. In some implementations, security device 210 may determine the configuration information based on file information, client device information, or the like. In some implementations, file information may include information determined based on the file to be analyzed for malware (e.g., file information determined based on analyzing the file). In some implementations, client device information may include information determined based on a client device 210 for which the file is intended (e.g., a client device 210 that requested the file, a client device 210 toward which the file is pushed, a client device 210 that receives the file, a client device 210 for which the file is destined, etc.). Security device 220 may use the configuration information to configure the sandbox environment before testing the file for malware.

The configuration information may identify a system configuration, such as an operating system to be used by the sandbox environment (e.g., an operating system type and/or version, such as Windows XP, Windows Vista, Windows 7, Windows 8, Android, iOS, OS X, etc.), a set of applications to be installed on and/or used by the sandbox environment (e.g., a browser application, such as Internet Explorer, Chrome, Firefox, Safari, etc.; a document handler; a word processor; a spreadsheet application; a Portable Document Format (pdf) handler; a video player; a Flash player; a security application; a firewall; an anti-virus program; etc.), a version of an application to be installed on and/or used by the sandbox environment (e.g., Internet Explorer version 7, 8, 9, 10, 11, etc.), a processor (e.g., CPU) architecture to be used by the sandbox environment (e.g., an ARM architecture, an x86 architecture, a 32-bit architecture, a 64-bit architecture, etc.), a compiler and/or an interpreter to be used by the sandbox environment (e.g., a Java virtual machine to be used to compile and/or interpret Java code), a file structure to be used in the sandbox environment, a network configuration to be used by the sandbox environment (e.g., communication protocol used to communicate with other devices, a port configuration for a set of ports, etc.), or the like.

In some implementations, security device 220 may determine the configuration information based on file information associated with the file. The file information may identify a system configuration, such as an operating system on which the file is capable of being executed, an application and/or a version of an application used to obtain the file (e.g., a browser and/or other application used to download the file), an application and/or a version of an application used to execute the file (e.g., a browser, a document handler, a word processor, a spreadsheet application, a pdf handler, a video player, a Flash player, etc.), a processor architecture capable of executing the file, a compiler capable of compiling the file, an interpreter capable of interpreting the file, a network configuration associated with the file (e.g., a communication protocol used by the file to communicate), or the like.

In some implementations, security device 220 may determine the file information by analyzing the file for a file indicator that indicates the configuration information to be used for the file. The file indicator may include, for example, a text string included in the file (e.g., a binary sample of the file), a source from which the file was obtained (e.g., a uniform resource identifier (URI) used to obtain the file, a website used to obtain the file, an application used to obtain the file, an email used to obtain the file, etc.), file metadata (e.g., static file information, such as a size of information included in the file, an entropy or randomness of information included in the file, etc.), or the like.

Additionally, or alternatively, security device 220 may determine the configuration information based on client device information associated with a client device 210 for which the file is intended. The client device information may identify a system configuration, such as an operating system executing on client device 210 (e.g., an operating system type and/or version), a set of applications and/or version(s) of the application(s) installed on and/or executing on client device 210 (e.g., a browser and/or other application used to download the file), a set of default applications used to execute particular types of files on client device 210 (e.g., a default browser, a default document handler application, a default word processor, a default spreadsheet application, a default pdf handler application, a default video player, a default Flash player, etc.), a runtime library and/or a runtime system used by client device 210, a processor architecture of client device 210, a compiler used by client device 210, an interpreter used by client device 210, a file structure associated with client device 210, a network configuration of client device 210, or the like.

In some implementations, security device 220 may determine the client device information by analyzing client device 210 and/or receiving the client device information from client device 210 and/or another device. As an example, security device 220 may request and/or receive the client device information from client device 210 and/or another device that stores client device information and/or analyzes client device 210 for the client device information. In some implementations, security device 220 may determine the client device information using an endpoint agent, a remote management agent, etc., used to manage client device 210. Additionally, or alternatively, security device 220 may determine the client device information using a fingerprinting technique in association with client device 210 (e.g., operating system fingerprinting). Additionally, or alternatively, security device 220 may determine the client device information by analyzing network traffic associated with client device 210 (e.g., by analyzing historical network traffic).

Additionally, or alternatively, security device 220 may load the client device information from a data structure. For example, security device 220 (or another device) may store a data structure that indicates a relationship between a particular client device 210 (e.g., using a client device identifier, such as a network address, an Internet protocol (IP) address, a media access control (MAC) address, a device name, etc.) and client device information associated with the particular client device 210 (e.g., a system configuration of client device 210). Security device 220 may identify the client device information associated with client device 210 using the client device identifier to arch the data structure for the client device information.

In some implementations, security device 220 may determine the configuration information based on the file information (e.g., based on an operating system, a set of applications, etc., indicated by the file information). In some implementations, security device 220 may determine the configuration information based on the client device information (e.g., based on an operating system, a set of applications, etc., indicated by the client device information). In some implementations, security device 220 may determine the configuration information based on both the file information and the client device information.

In some implementations, the file information and the client device information may indicate conflicting (e.g., different) system configurations for different types of configuration information (e.g., may indicate different operating systems, different applications, etc.). In this case, security device 220 may select either the configuration information indicated by the file information or the configuration information indicated by the client device information to resolve the conflict (e.g., based on a user preference, based on a set of rules, etc.).

In some implementations, security device 220 may configure multiple sandbox environments with different system configurations, and may analyze the file in each of the multiple sandbox environments. For example, security device 220 may configure a first sandbox environment based on file information, may configure a second sandbox environment based on client device information, and may analyze the file using the first sandbox environment and the second sandbox environment.

In some implementations, security device 220 may perform a probabilistic analysis of the file (e.g., based on file information) to determine the configuration information. For example, security device 220 may determine likelihoods that different system configurations (e.g., configured using different configuration information) will identify the file as malware. In this case, security device 220 may select, for the sandbox environment, the configuration information associated with the system configuration most likely to identify the file as malware (e.g., as compared to other system configurations). Additionally, or alternatively, security device 220 may determine likelihoods that different system configurations will accurately identify whether the file includes malware. In this case, security device 220 may select, for the sandbox environment, the configuration information associated with the system configuration most likely to accurately identify whether the file is malware (e.g., as compared to other system configurations).

When security device 220 uses a probabilistic analysis to determine the configuration information, security device 220 may generate a probabilistic model by training (e.g., using machine learning) different system configurations using a training set of files (e.g., some of which are known to be malware and some of which are known not to be malware). In this way, security device 220 may train the probabilistic model to indicate a likelihood that a particular system configuration will identify a file as malware, a likelihood that a particular system configuration will accurately identify whether a file is malware, or the like, based on file information associated with the file. Security device 220 may then use file information, associated with a file to be tested, to determine one or more of these likelihoods when configuring the sandbox environment.

In some implementations, security device 220 may determine a first type of configuration information based on file information, may determine a second type of configuration information based on client device information, and/or may determine a third type of configuration information based on a probabilistic analysis. Security device 220 may determine the types of configuration information to determine using these different techniques based on a user preference (e.g., received based on user input), based on a set of rules, based on a set of heuristics, or the like.

In some implementations, security device 220 may determine a first type of configuration information based on the file information and/or the client device information, but may not be able to determine a second type of configuration information based on the file information and/or the client device information because the file information and/or the client device information does not indicate the second type of configuration information. In this case, security device 220 may use a probabilistic analysis to determine the second type of configuration information.

As further shown in FIG. 4, process 400 may include configuring the sandbox environment based on the configuration information (block 430). For example, security device 220 may use the configuration information to configure the sandbox environment. The configuration information may identify a system configuration for the sandbox environment, and security device 220 may load and/or configure a sandbox environment with the identified system configuration. In some implementations, security device 220 may store sandbox profiles associated with different system configurations for the sandbox environment, and may load a particular sandbox profile that matches (e.g., within a threshold degree of similarity) the determined configuration information.

For example, security device 220 may configure and/or load a sandbox environment with a particular operating system, particular applications installed in the sandbox environment, particular default applications for executing particular file types in the sandbox environment, or the like. In some implementations, security device 220 may configure and/or load multiple sandbox environments with different system configurations.

As further shown in FIG. 4, process 400 may include analyzing the file in the sandbox environment based on configuring the sandbox environment (block 440), and determining whether the file includes malware (block 450). For example, security device 220 may analyze the file for malware in the sandbox environment. In some implementations, security device 220 may analyze the file by executing the file in the sandbox environment, and by monitoring the file and/or the sandbox environment for behavior indicative of malware. By analyzing the file in a customized sandbox environment rather than a standard sandbox environment, security device 220 may increase the likelihood that the sandbox environment correctly identifies whether the file is malware, thereby improving information security.

As further shown in FIG. 4, if the file does not include malware (block 450—NO), then process 400 may include permitting the file to be accessed (block 460). For example, if security device 220 does not determine that the file includes malware (e.g., after monitoring the file in the sandbox environment for a threshold amount of time), then security device 220 may perform an action to permit the file to be accessed. In some implementations, security device 220 may permit the file to be accessed by identifying the file as unsuspicious. In this case, security device 220 may store a malware indicator, in association with the file, that indicates that the file is unsuspicious (e.g., is not malware).

As another example, assume that client device 210 requests the file from a device associated with network 240 (e.g., a web server, a host server, etc.). In this case, security device 220 may receive the request, may request the file from the device, may receive the file from the device, and may test the file in the configured sandbox environment before sending the file to client device 210. Additionally, or alternatively, assume that a device, associated with network 240, pushes a file to client device 210. In this case, security device 220 may receive the file, and may analyze the file in the configured sandbox environment before sending the file to client device 210. If security device 220 determines that the file does not include malware, then security device 220 may permit the file to be accessed by providing the file to client device 210. In this way, security device 220 may protect client devices 210, of customer network 230, from security threats.

As further shown in FIG. 4, if the file includes malware (block 450 YES), then process 400 may include performing an action to counteract the malware (block 470). For example, if security device 220 determines that the file includes malware, then security device 220 may perform an action to counteract the malware. In some implementations, security device 220 may counteract the malware by identifying the file as suspicious. In this case, security device 220 may store a malware indicator, in association with the file, that indicates that the file is suspicious (e.g., is malware). In this way, security device 220 and/or another device may use the malware indicator to identify the file as malware, and may perform an action to counteract the malware.

Additionally, or alternatively, security device 220 may counteract the malware by identifying the file (e.g., in memory) and deleting the file from memory. In this way, security device 220 may prevent the file from harming security device 220 and/or client device 210.

As another example, assume that client device 210 requests the file from a device associated with network 240 (e.g., a web server, a host server, etc.). In this case, security device 220 may receive the request, may request the file from the device, may receive the file from the device, and may test the file in the configured sandbox environment before sending the file to client device 210. Additionally, or alternatively, assume that a device, associated with network 240, pushes a file to client device 210. In this case, security device 220 may receive the file, and may analyze the file in the configured sandbox environment before sending the file to client device 210. If security device 220 determines that the file includes malware, then security device 220 may perform the action to counteract the malware by preventing the file from being provided to client device 210. In this way, security device 220 may protect client devices 210, of customer network 230, from security threats.

In some implementations, if security device 220 determines that the file includes malware, then security device 220 may counteract the malware by monitoring the file (e.g., by monitoring communications sent by the file) to identify a device with which the file communicates (e.g., to identify a command and control server). In this case, security device 220 may block communications associated with the device, may provide an instruction to client device 210 and/or another device associated with customer network 230 (e.g., a firewall, a router, a gateway, etc.) to block communications associated with the device (e.g., to block communications to and/or from the device), or the like. In this way, security device 220 may prevent a malicious file from harming client device 210.

Additionally, or alternatively, security device 220 may provide a notification that identifies client devices 210 that are communicating with the device (e.g., the command and control server) to identify and protect these client devices 210. In this way, security device 220 may protect client devices 210, of customer network 230, from security threats.

By configuring a sandbox environment based on configuration information file information associated with a file to be tested for malware, client device information associated with client device 210 for which the file is intended, etc.), security device 220 may improve the effectiveness of malware testing for files intended for client device 210. For example, security device 220 may reduce false positive results and/or false negative results generated based on the testing, thereby providing more accurate malware testing results and improving information security of client device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to process 400 shown in FIG. 4. FIGS. 5A-5F show an example of configuring a sandbox environment for malware testing.

Figure 5A:
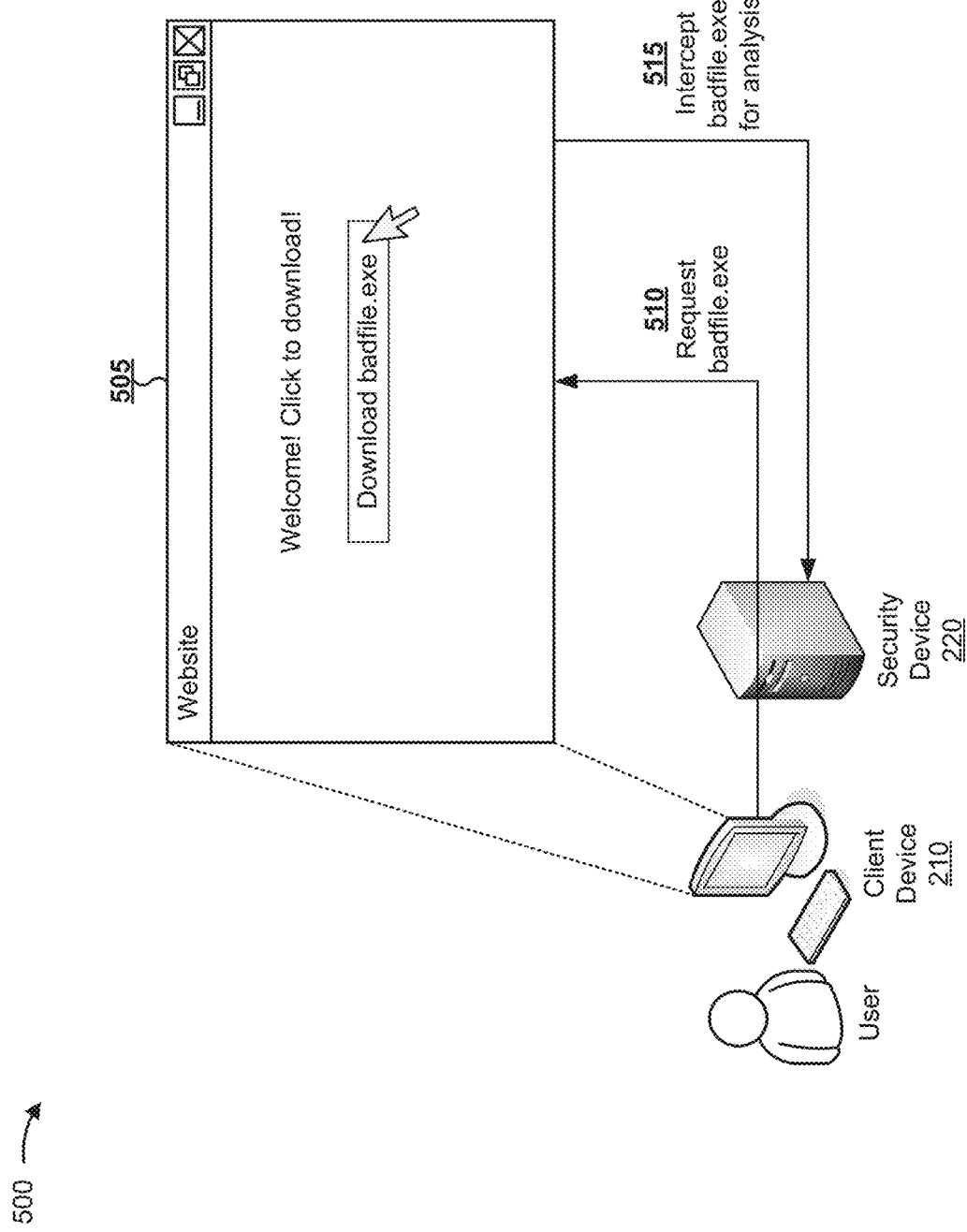
FIGS. 5A-5F are diagrams of an example implementation relating to the example process shown in FIG. 4.

As shown in FIG. 5A, and by reference number 505, assume that a user interacts with client device 210 to navigate to a website using a browser, and to request a file, shown as "badfile.exe." As shown by reference number 510, assume that the request is routed from client device 210 to security device 220 before being routed to a web server associated with the website. As shown by reference number 515, assume that security device 220 receives (e.g., intercepts) the file for analysis before the file is provided to client device 210.

Figure 5D:
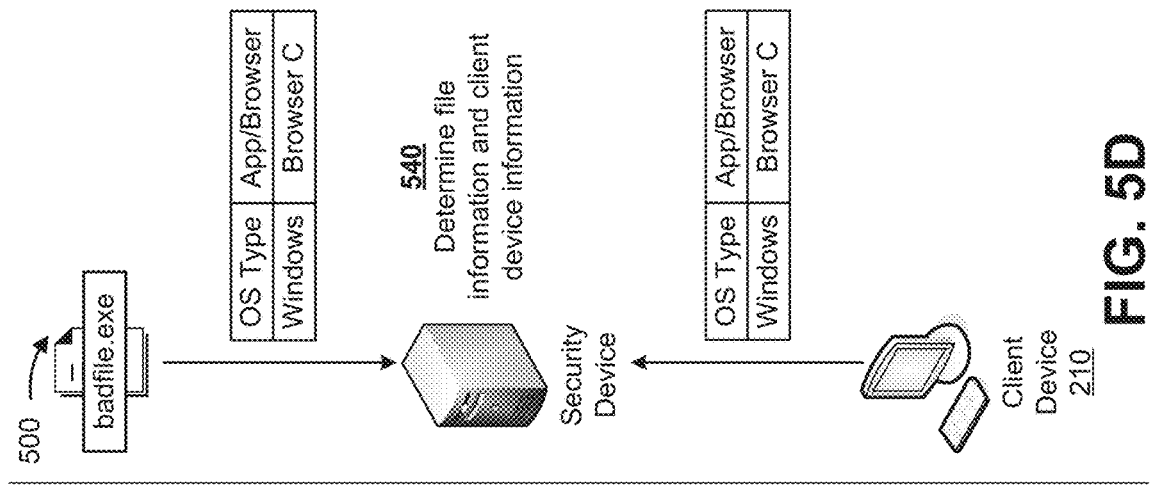
Figure 5C:
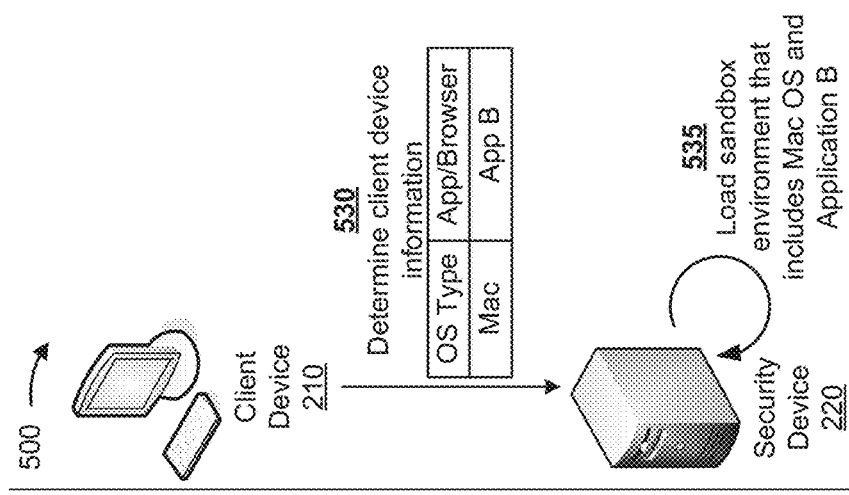
Figure 5B:
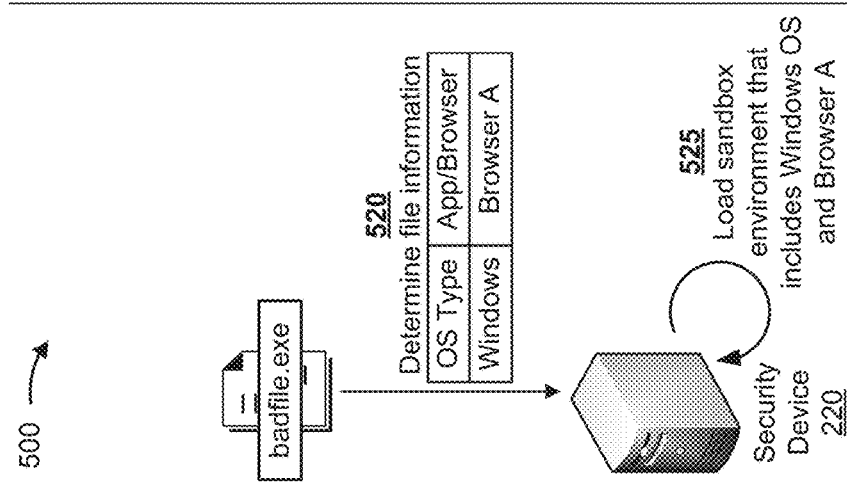

FIGS. 5B-5D show different options via which security device 220 may determine configuration information for configuring a sandbox environment for analyzing the file (e.g., badfile.exe). FIG. 5B shows an example where security device 220 determines the configuration information based on file information. FIG. 5C shows an example where security device 220 determines the configuration information based on client device information. FIG. 5D shows an example where security device 220 determines the configuration information based on file information and client device information.

As shown in FIG. 5B, and by reference number 520, in some implementations, security device 220 may determine file information associated with the file to be analyzed (e.g., badfile.exe). For example, and as shown, security device 220 may analyze the file to determine that the file is intended for execution in a Windows operating system, and is intended for execution by Browser A. As shown by reference number 525, based on this file information, security device 220 may load and/or configure a sandbox environment that includes a Windows operating system with Browser A installed and/or used as the default browser.

As shown in FIG. 5C, and by reference number 530, in some implementations, security device 220 may determine client device information associated with client device 210 that requested the file. For example, and as shown, security device 220 may receive client device information that indicates that client device 210 is executing a Mac operating system, and has Application B installed. As shown by reference number 535, based on this client device information, security device 220 may load and/or configure a sandbox environment that includes a Mac operating system with Application B installed and/or used as a default application for handling a particular type of file (e.g., an executable file, such as badfile.exe).

As shown in FIG. 5D, and by reference number 540, in some implementations, security device 220 may determine file information, associated with the file to be tested, and client device information associated with client device 210 that requested the file. For example, and as shown, security device 220 may receive file information that indicates that the file is capable of being executed using a Windows operating system, and was requested using Browser C. As further shown, security device 220 may receive client device information that indicates that client device 210 is executing a Windows operating system, and used Browser C to request the file. Assume that security device 220 uses this file information and client device information to configure and/or load a sandbox environment that includes a Windows operating system and Browser C.

Figure 5E:
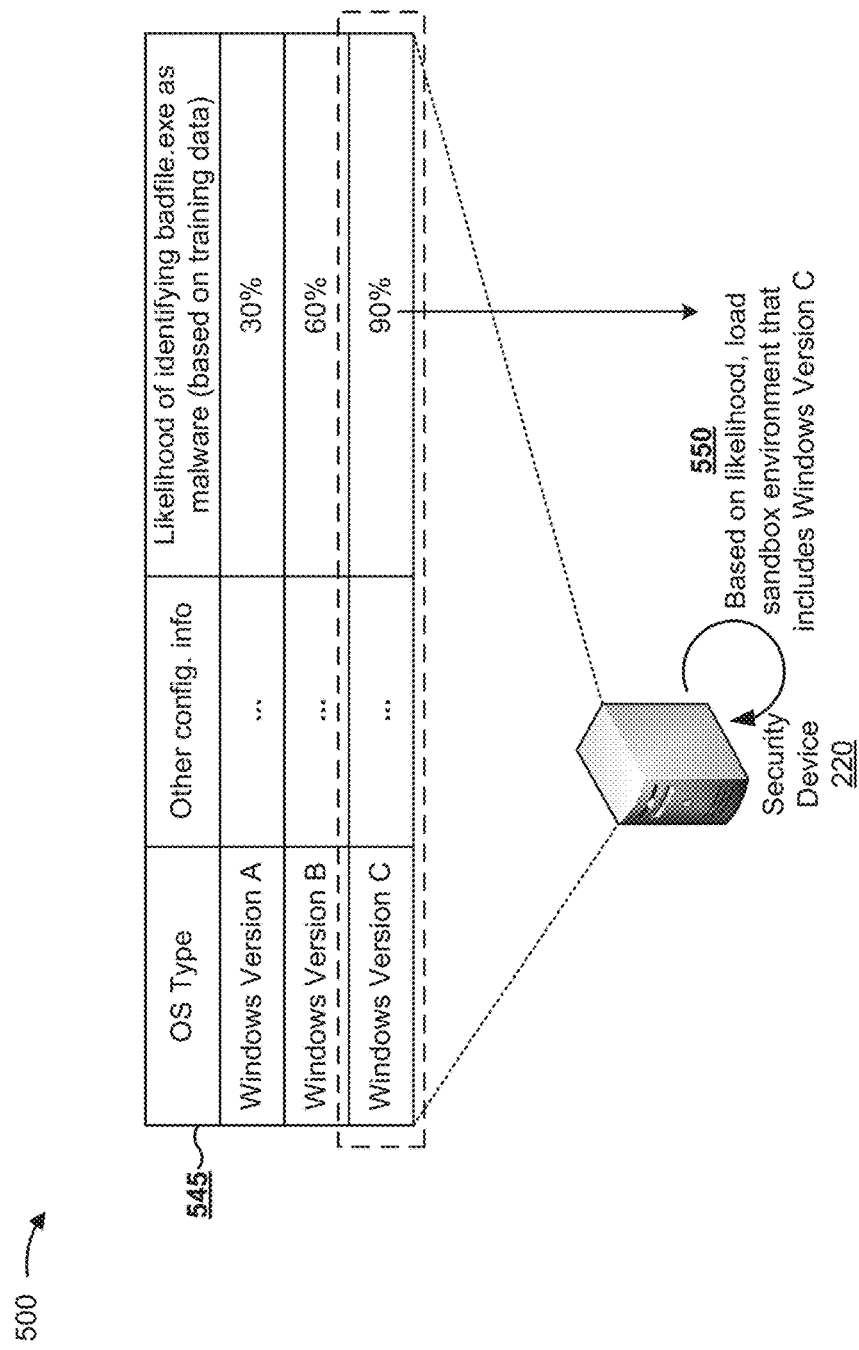
Figure 5F:
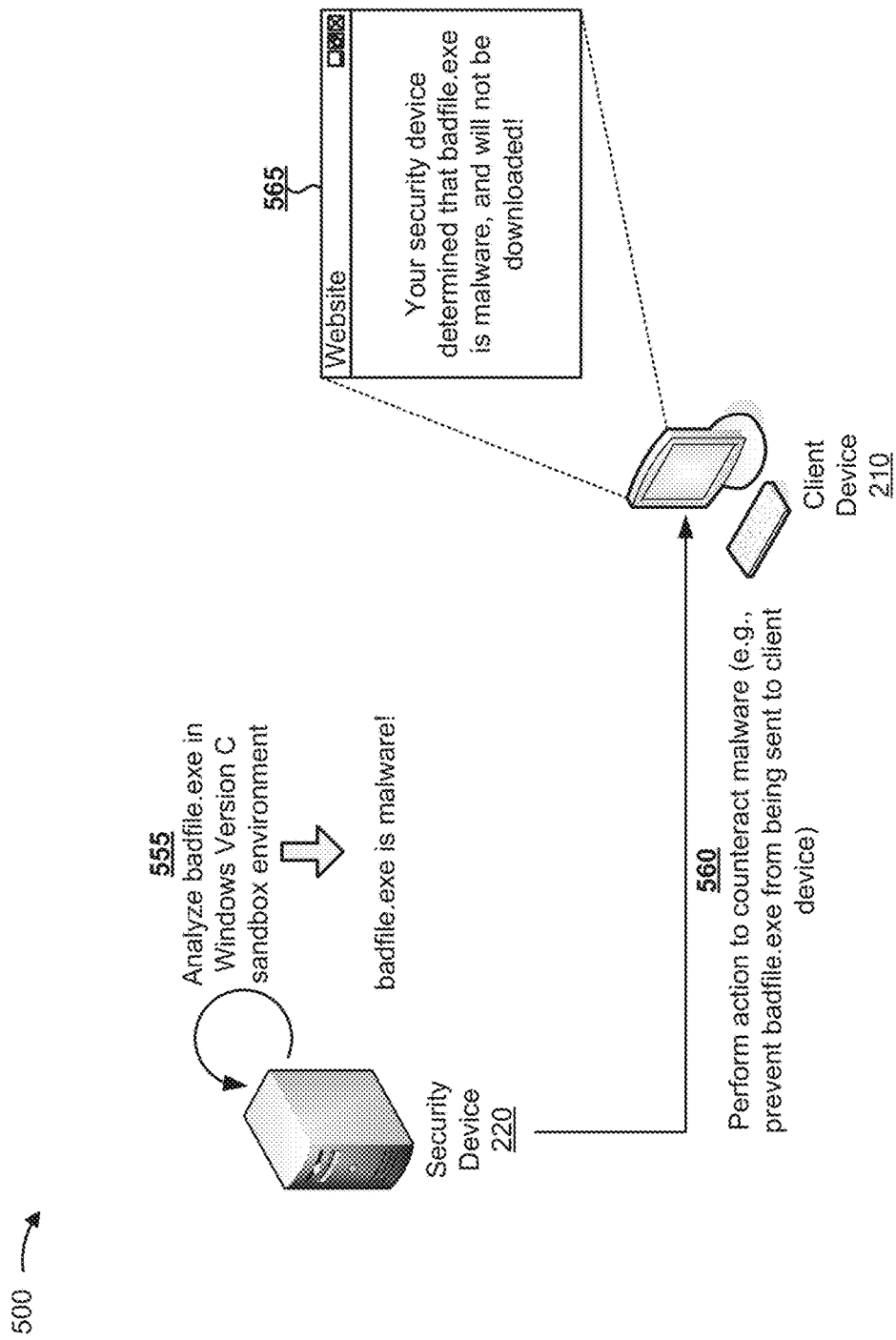

As shown in FIG. 5E, and by reference number 545, assume that security device 220 may select among multiple versions of a Windows operating system for configuring the sandbox environment, shown as Windows Version A, Windows Version B, and Windows Version C. As further shown, assume that security device 220 has generated a probabilistic model, using training data, and has applied file information for badfile.exe to the probabilistic model to determine that Windows Version A has a 30% likelihood of identifying badfile.exe as malware, that Windows Version B has a 60% likelihood of identifying badfile.exe as malware, and that Windows Version C has a 90% likelihood of identifying badfile.exe as malware. As shown by reference number 550, assume that security device 220 selects Windows Version C for configuring the sandbox environment because Windows Version C has the highest likelihood of identifying badfile.exe as malware (e.g., as compared to Windows Version A and Windows Version B). For example, assume that security device 220 loads and/or configures a sandbox environment that includes Windows Version C As shown in FIG. 5F, and by reference number 555, assume that security device 220 analyzes badfile.exe in the sandbox environment that includes Windows Version C, and determines that badfile.exe is malware. As shown by reference number 560, based on this determination, assume that security device 220 performs an action to counteract the malware. For example, and as shown by reference number 565, assume that security device 220 prevents badfile.exe from being provided to client device 210, which requested badfile.exe.

In this way, security device 220 may configure a custom sandbox environment to increase the effectiveness of malware detection based on a file being analyzed, based on a client device that requested the file, or the like. In this way, security device 220 may improve information security.

As indicated above, FIGS. 5A-5F are provided merely as an example. Other examples are possible and may differ from what was described with regard to FIGS. 5A-5F.

Implementations described herein may assist in configuring a sandbox environment for malware testing based on a file being tested and/or a client device being protected, thereby increasing the effectiveness of malware testing and improving computer security.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
 a memory; and
 one or more processors to:
  receive a file to be analyzed in a sandbox environment;
  determine file information based on analyzing the file,
   the file information identifying one or more features of a system configuration;
  determine, based on the file information, the system configuration,
   the system configuration including information regarding:
    a compiler to be used by the sandbox environment, and
    an operating system to be used by the sandbox environment;
  configure the sandbox environment using the system configuration;

analyze the file in the sandbox environment based on configuring the sandbox environment using the system configuration;
determine, based on analyzing the file in the sandbox environment, whether the file includes malware; and selectively:
perform an action to counteract the malware based on determining that the file includes malware, or
permit the file to be accessed based on determining that the file does not include malware.

2. The device of claim 1, where the one or more processors, when determining the system configuration, are to:
determine the system configuration based on client device information regarding a client device for which the file is intended.

3. The device of claim 1, where the system configuration further includes information regarding at least one of:
an application used to obtain the file,
a version of an application used to obtain the file,
an application used to execute the file,
a version of an application used to execute the file,
a processor architecture capable of executing the file,
an interpreter capable of interpreting the file, or
a network configuration associated with the file.

4. The device of claim 1, where the system configuration is identified by client device information associated with a client device for which the file is intended.

5. The device of claim 4, where the system configuration further includes information regarding at least one of:
a set of applications installed on or executing on the client device,
a version of a set of applications installed on or executing on the client device,
a set of default applications used to execute particular type of files on the client device,
a runtime library used by the client device,
a runtime system used by the client device,
a processor architecture of the client device,
an interpreter used by the client device,
a file structure associated with the client device, or
a network configuration associated with the file.

6. The device of claim 1, where the file information indicates a first system configuration;
where client device information indicates a second system configuration; and
where the one or more processors, when determining the system configuration, are to:
select the first system configuration based on the file information, or
select the second system configuration based on the client device information.

7. The device of claim 1, where the one or more processors are further to:
analyze the file for a file indicator that indicates the system configuration; and
where the one or more processors, when determining the file information, are to:
determine the file information based on analyzing the file for the file indicator.

8. A non-transitory computer-readable medium storing instructions, the instructions comprising:
one or more instructions that, when executed by one or more processors, cause the one or more processors to:
receive a file to be analyzed for malware using a sandbox environment;
determine file information based on analyzing the file, the file information identifying one or more features of a system configuration;
determine, based on the file information, the system configuration,
the system configuration including information regarding:
a compiler to be used by the sandbox environment, and
an operating system to be used by the sandbox environment;
configure the sandbox environment using the system configuration;
analyze the file for malware using the sandbox environment based on configuring the sandbox environment using the system configuration;
determine, based on analyzing the file in the sandbox environment, whether the file includes malware; and selectively:
perform an action to counteract the malware based on determining that the file includes malware, or
permit the file to be accessed based on determining that the file does not include malware.

9. The non-transitory computer-readable medium of claim 8, where the one or more instructions, that cause the one or more processors to analyze the file in the sandbox environment, cause the one or more processors to:
analyze the file in the sandbox environment by executing the file in the sandbox environment and monitoring at least one of the file or the sandbox environment for behavior indicative of the malware.

10. The non-transitory computer-readable medium of claim 8, where the one or more instructions, that cause the one or more processors to perform the action to counteract the malware, cause the one or more processors to:
delete the file.

11. The non-transitory computer-readable medium of claim 8, where the one or more instructions, that cause the one or more processors to perform the action to counteract the malware, cause the one or more processors to:
monitor the file to identify a device with which the file communicates.

12. The non-transitory computer-readable medium of claim 11, where the one or more instructions, when executed by the one or more processors, further cause the one or more processors to:
block communications associated with the device.

13. The non-transitory computer-readable medium of claim 11, where the one or more instructions, when executed by the one or more processors, further cause the one or more processors to:
provide an instruction to another device to block communications associated with the device.

14. A method, comprising:
receiving, by a device, a file to be analyzed in a computing environment;
determining, by the device, file information based on analyzing the file,
the file information identifying one or more features of a system configuration;
determining, by the device and based on the file information, the system configuration,
the system configuration including information regarding:
a compiler to be used by the computing environment, and
an operating system to be used by the computing environment;

configuring, by the device, the computing environment using the system configuration;

analyzing, by the device, the file in the computing environment based on configuring the computing environment using the system configuration;

determining, by the device and based on analyzing the file in the computing environment, whether the file includes malware; and selectively:

performing, by the device, an action to counteract the malware based on determining that the file includes malware, or permitting, by the device, the file to be accessed based on determining that the file does not include malware.

15. The method of claim 14, where the computing environment is a first sandbox environment;

where the system configuration is a first system configuration;

where configuring the computing environment comprises:
configuring the first sandbox environment using the first system configuration;

where the method further comprises:
configuring a second sandbox environment using a second system configuration; and where analyzing the file comprises:
analyzing the file in the first sandbox environment, and
analyzing the file in the second sandbox environment.

16. The method of claim 14, where determining the system configuration comprises:
determining the system configuration by performing a probabilistic analysis of the file.

17. The method of claim 14, further comprising:
determining a likelihood that the system configuration will identify the file as malware; and where determining the system configuration comprises:
determining the system configuration based on determining the likelihood that the system configuration will identify the file as malware.

18. The method of claim 14, further comprising:
determining likelihoods that a plurality of system configurations will identify the file as malware; and where determining the system configuration comprises:
determining the system configuration based on the system configuration having a highest likelihood to identify the file as malware.

19. The method of claim 14, further comprising:
storing one or more sandbox profiles associated with one or more system configurations; and loading a particular sandbox profile, of the one or more sandbox profiles, that matches the system configuration; and where configuring the computing environment comprises:
configuring the computing environment based on loading the particular sandbox profile.

20. The method of claim 14, further comprising:
storing an indicator, associated with the file, that indicates that the file is not suspicious based on determining that the file does not include malware.

* * * * *